United States Patent

Knitl

[11] Patent Number: 5,844,982
[45] Date of Patent: Dec. 1, 1998

[54] METHOD FOR DETERMINING FREE AGENT COMMUNICATION TERMINAL APPARATUS IN COMMUNICATION NETWORKS WITH AN AUTOMATIC CALL DISTRIBUTION

[75] Inventor: Reinhard Knitl, Munich, Germany

[73] Assignee: Siemens Aktiengesellschaft, Munich, Germany

[21] Appl. No.: 722,616

[22] Filed: Sep. 27, 1996

[30] Foreign Application Priority Data

Sep. 27, 1995 [DE] Germany ............... 195 35 958.5

[51] Int. Cl.$^6$ .......................... H04M 3/00; H04M 5/00; H04M 3/42; H04M 7/00
[52] U.S. Cl. .................. 379/265; 379/265; 379/266; 379/309; 379/211; 379/207; 379/221
[58] Field of Search .................. 379/265, 266, 379/309, 211, 214, 219, 220, 221, 207, 210

[56] References Cited

U.S. PATENT DOCUMENTS

| | | | |
|---|---|---|---|
| 4,400,587 | 8/1983 | Taylor et al. | 379/266 |
| 4,953,204 | 8/1990 | Cuschleg, Jr. et al. | 379/266 |
| 5,291,552 | 3/1994 | Kerrigan et al. | 379/220 |
| 5,299,259 | 3/1994 | Otto | 379/266 |
| 5,335,268 | 8/1994 | Kelly, Jr. et al. | 379/112 |
| 5,450,482 | 9/1995 | Chen et al. | 379/207 |
| 5,524,147 | 6/1996 | Bean | 379/265 |
| 5,537,466 | 7/1996 | Taylor et al. | 379/266 |
| 5,590,188 | 12/1996 | Crockett | 379/225 |
| 5,619,557 | 4/1997 | Van Berkum | 379/88 |
| 5,633,924 | 5/1997 | Kaish et al. | 379/266 |
| 5,642,411 | 6/1997 | Theis | 379/266 |
| 5,740,238 | 4/1998 | Flockhart et al. | 379/309 |
| 5,754,639 | 5/1998 | Flockhart et al. | 379/221 |

FOREIGN PATENT DOCUMENTS

| | | |
|---|---|---|
| 0421583 A1 | 10/1991 | European Pat. Off. . |
| 0526103 A2 | 3/1993 | European Pat. Off. . |
| 0647051 A1 | 5/1995 | European Pat. Off. . |

Primary Examiner—Daniel S. Hunter
Assistant Examiner—Benny Q. Tieu
Attorney, Agent, or Firm—Hill & Simpson

[57] ABSTRACT

The method relates to a group (G) of agent communication terminal apparatus (AKE) that are distributed over several communication systems (KS1, 2) of a communication network. If, given an incoming call (ar) in a communication system (KS1), no allocated agent communication terminal apparatus (AKE) is still free for the respective group (G), a resource request (ra) is transmitted to communication systems (KS2) to which agent communication terminal apparatus (AKE) of the same group (G) are connected. Using a response (aw), the addressed communication systems (KS2) indicate whether one of the agent communication terminal apparatus (AKE) is free or whether they are all occupied. After the signaling of a free agent communication terminal apparatus (AKE), the incoming call (ar) is switched to the respective communication system (KS2). With the method, the groups (G) of agent communication terminal apparatus (AKE) are distributed to several communication systems (KS1, 2), with efficient and uniform utilization thereof.

20 Claims, 3 Drawing Sheets

METHOD FOR DETERMINING FREE AGENT COMMUNICATION TERMINAL APPARATUS IN COMMUNICATION NETWORKS WITH AN AUTOMATIC CALL DISTRIBUTION

BACKGROUND OF THE INVENTION

For a convenient distribution of incoming calls in communication systems of a communication network to predetermined groups of agent communication terminal apparatus, they are equipped with an automatic call distribution function. The automatic call distribution (also known as ACT among those skilled in the art) is essentially realized by a data processing installation connected to the respective communication systems, such as e.g. an ACD server. For the communication exchange between the communication system and the ACD server, an ACL (Applications Connectivity Link) interface is provided in both installations. As a transmission procedure, the MSV1 procedure or another transmission protocol can for example be used. A program structure is implemented in the communication system, by means of which structure both the switching-oriented events (in particular the incoming calls) are signaled to the ACD server through event messages, and also switching-oriented instructions transmitted by the ACD server via the ACL interface are brought to execution. In relation to an automatic call distribution, these are in particular the reswitching of incoming calls to agent communication terminal apparatus determined by the automatic call distribution.

With an automatic call distribution, a group of agent communication terminal apparatus is allocated to one or more service numbers, e.g. several call accept positions are allocated to a call number of a company. A service number hereby represents a service communication connection (represents a line group with a call folder) to which the agent communication terminal apparatus that form the desired group are allocated. An incoming call, initialized by dialing a service number in an internal or external communication terminal apparatus, is switched through to the line group and is kept there in the call folder. At the same time, the arrival of a call for this service number is signaled to the ACD server through corresponding event messages. By means of the automatic call distribution implemented in the ACD server, a free agent communication terminal apparatus of the group is determined, and the incoming call is switched or, respectively, reswitched to the determined agent communication terminal apparatus. The reswitching is brought about by means of a switching-oriented instruction transmitted to the communication system by the ACD server. By means of the automatic call distribution, incoming calls can be held in a waiting queue, music or messages can be inserted during the hold time, and if all agent communication terminal apparatus are occupied, these calls can be forwarded to recording and answering equipment or can be rejected.

In addition, in future communication networks with an automatic call distribution, the agent communication terminal apparatus of a group can be distributed over several communication systems, i.e. incoming calls of a group are to be switched to further communication systems in case of occupied agent communication terminal apparatus of a communication system. No method for realizing groups of agent communication terminal apparatus that overlap communication systems is currently known.

SUMMARY OF THE INVENTION

It is an object of the present invention to provide a communication network with automatic call distribution in which incoming calls can be switched to a free agent communication terminal apparatus of a group of agent communication terminal apparatus that are distributed over several communication systems.

In general terms the present invention is a method for determining free agent communication terminal apparatus in communication networks with an automatic call distribution. Incoming calls addressed to a service number are respectively switched to a free agent communication terminal apparatus of a communication system, which is selected through the automatic call distribution from a group of agent communication terminal apparatus allocated to the service number. The agent communication terminal apparatus allocated to the group are distributed via several communication systems of the communication network. Given a call with a service number coming into a communication system, for which call there is no longer a free agent communication terminal apparatus in the allocated group of this communication system, resource requests are formed and are transmitted to those communication systems to which agent communication terminal apparatus of the respective group are distributed. In each communication system that receives a resource request the availability of an agent communication terminal apparatus allocated to the respective group is determined. A response is formed and is transmitted to the requesting communication system. A communication system with a free agent communication terminal apparatus of the respective group is identified in the requesting communication system from the transmitted response. The incoming call is further switched to the identified communication system by means of the automatic call distribution in the sense of a switching to the free agent communication terminal apparatus.

An important aspect of the inventive method is that given an incoming call, with a service number, to a communication system in which all agent communication terminal apparatus of the allocated group are occupied, a resource request is formed in the communication system and is selectively transmitted to those communication systems to which agent communication terminal apparatus of the respective group are connected. The respective group in one of the further communication systems can also be a different group with a different service number; however, this different group is incorporated into the respective group as an "overflow group," whereby in case of occupied agent communication terminal apparatus in a communication system an incoming call is to be forwarded to the "overflow group" of the further communication system. In the addressed communication systems, the respective group is monitored for a free agent communication terminal apparatus. A response is subsequently formed and is transmitted to the requesting communication system, whereby the response indicates a free agent communication terminal apparatus, or else that no such apparatus is free. The requesting communication system evaluates the responses and switches the incoming call to a further communication system indicating a free agent communication terminal apparatus, in which system the incoming call is switched to the free agent communication terminal equipment.

The resource request and the response are transmitted either via the communication network that connects the communication systems or via an additional local communication network. In case of a transmission via the communication network (KN), additional control routines for this exchange of information are required in the communication systems, which routines are an additional dynamic load on the communication systems. Since to a large extent local networks are installed at the operating companies (also private operating companies), the transmission of information can advantageously take place via these. Since in addition the data processing installations that realize the automatic call distribution, such as e.g. personal computers, are standardly connected to the communication systems, the connection to a local network can advantageously take place directly at the data processing installation, and the exchange of information via the local network can be controlled by this installation, by which means the additional controlling of the exchange of information can be omitted in the communication systems, resulting in a considerable relief of the burden on these systems.

Advantageously, given availability of one of the agent communication terminal apparatus allocated to the respective group, the determined agent communication terminal apparatus is reserved. That is it is no longer switched for further incoming calls. According to a further development of the inventive method, given a reservation, after the determination of a communication system signaling a free agent terminal communication apparatus, a reservation release is formed by means of the automatic call distribution for those communication systems that likewise signal a free agent communication terminal apparatus of the respective group, and this release is transmitted to the respective communication systems, whereupon the reservation of the agent communication terminal apparatus is removed in these. By means of this reservation release, the reservation of a free agent communication terminal apparatus is removed again in the shortest time, and is again available for the reception of further incoming calls of the respective group. This represents a maximal exploitation of the resource "agent communication terminal apparatus," but an additional signaling is required for the transmission of the reservation release.

Alternatively, i.e. without the reservation release, according to a further advantageous construction of the inventive method, the reservation of the agent communication terminal apparatus of the respective group is removed after a predetermined time interval in the communication systems that transmit a response to the requesting communication system, provided that no reservation release for the respective agent communication terminal apparatus is received there. The waiting for this time interval does not represent the most efficient use of the resource "agent communication terminal apparatus," but the respective communication system is dynamically relieved of stress by the omission of the signaling for the transmission of the reservation release.

According to a further advantageous development of the inventive method, in the communication systems that receive a resource request, after a determination of several free agent communication terminal apparatus of a group, that free agent communication terminal apparatus is selected to which no incoming call has been switched during the largest time interval. In this way, the most equal utilization possible of the agent communication terminal apparatus within a communication system is achieved.

According to a further construction of the inventive method, in the requesting communication system after the reception of several responses, respectively indicating a free agent communication terminal apparatus of the respective group, the free agent communication terminal apparatus is chosen associated with the response in which the indicated communication system is preferred according to a predetermined sequence, and/or in which no incoming call has been switched to the indicated free agent communication terminal apparatus for the longest time interval, and/or in which the most agent communication terminal apparatus (AKE) of a group are free in the indicated communication system, and/or in which the average non-occupied time interval of all the agent communication terminal apparatus configured in the respective group is the longest. The indicated criteria for the selection of a free agent communication terminal apparatus can be combined arbitrarily, i.e. can also be differently combined from service number to service number or, respectively, from group to group.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
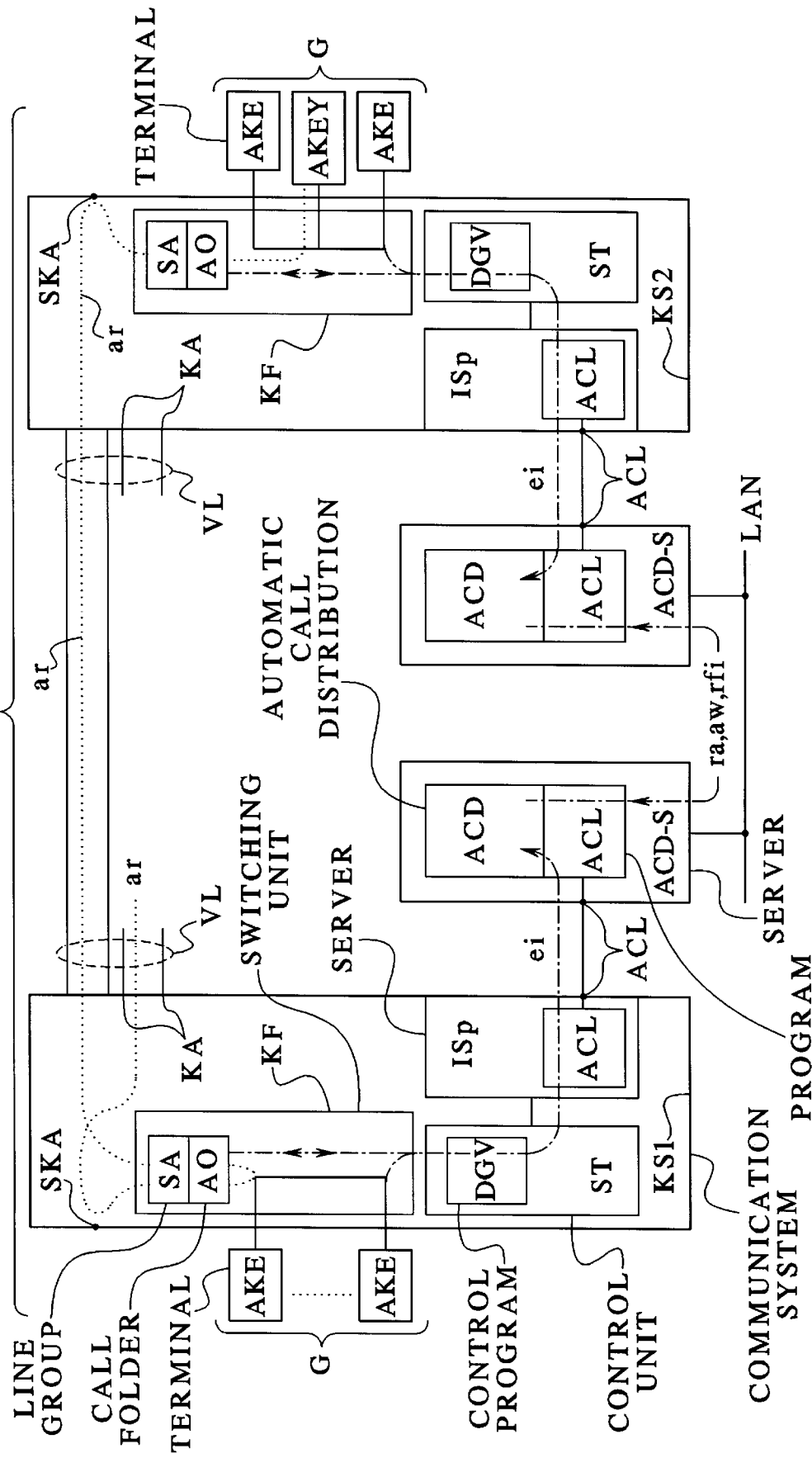
FIG. 1 is a block circuit diagram of a communication network with automatic call distribution.

FIG. 1 shows a communication network KN, represented by two communication systems KS1, 2, given as examples. The two communication systems KS1, 2, both realized in the same way, are respectively equipped with the function "automatic call distribution," known to those skilled in the art as ACD. The components are explained on the basis of the first communication system KS1, but however are realized in the second and further (not shown) communication systems in the same way. The first communication system KS1 is connected with an ACD server ACD-S that essentially realizes the automatic call distribution. The ACL interface ACL, which controls and monitors the communication exchange, is formed in the first communication system KS1 and in the ACD server ACD-S by a program structure ACL and by a physical connection (not shown), e.g. a V.24 interface. In addition, a program structure ACD that realizes the automatic call distribution is implemented in the ACD server ACD-S. In the first communication system KS1, the program structure ACL is embedded in an integrated operating and maintenance server ISp that administers and monitors the first communication system KS1. A control unit ST that controls the first communication system KS1 is connected with the operating and maintenance server ISp and with a switching unit KF.

Alongside the switching-oriented program (not shown), the control unit ST contains an ACD control program structure DGV, in which the switching-oriented connection states of incoming calls ar are acquired and are inserted into switching-oriented event messages ei and are transmitted to the ACD program structure ACD via the ACL interface ACL for evaluation. Conversely, switching-oriented instructions amo, formed in the ACD program structure ACD and transmitted via the ACL interface ACL to the ACD control program structure DGV are executed, e.g. connection reswitchings. In the switching unit KF, a line group SA with a call folder AO is configured by means of corresponding operating and maintenance inputs, to which a predetermined group G of agent communication terminal apparatus AKE is allocated. As explained above, in the second communication system KS2 a line group SA with a call folder AO is likewise configured, to which is allocated a group G of agent communication terminal apparatus AKE. Both groups G belong to the same group G of agent communication terminal apparatus AKE, for example, agent communication terminal apparatus AKE are a single company. The group G of the second communication system KS2 can also represent a different group of agent communication terminal apparatus (AKE) with its own service number (not shown). However, this different group, including the different service number, is indicated in the first communication system KS as an "overflow group" in addition to the respective group G, and is thereby to be regarded as incorporated into the respective group G, i.e. finally represents a group G. This therefore means that for an incoming call ar with service number sr, the agent communication terminal apparatus AKE of the respective group G, together with those of the other group in the second communication system KS, represent a single group G.

In the first communication system KS1, a line group SA, including a call folder AO, is connected to a service communication connection SKA, and connection lines VL are connected via further communication connections KA, whereby a portion of the connection lines VL is guided to the second communication system KS2 and a further portion of the connection lines VL is guided to the further communication systems (not shown) of the communication network KN. The communication network KN represents for example a private communication network, whereby the further portion of the connection line VL are guided to communication systems in the private or in the public communication network (e.g. the public telephone network). The calls ar, with the corresponding call number (i.e. service number) sr, coming in via the further portion of the connection lines VL, are forwarded to the line group SA. A call folder AO is allocated to the line group, by means of which folder, together with the ACD control program structure DGV, the incoming call ar is kept, and, including the service number sr, is signaled by means of a switching-oriented event message ei via the ACL interface ACL of the program structure ACD for the automatic call distribution. This determines a free agent communication terminal apparatus AKE according to predetermined criteria, and forms a switching-oriented instruction amo, which is transmitted to the ACD control program structure DGV via the ACL interface ACL, by means of which program structure the incoming call ar is reswitched to the free agent communication terminal apparatus AKE.

For an information exchange, in particular for the transmission of an inventive resource request ar, a response aw and a reservation release rfi, the ACD servers ACD-S are connected to a local network LAN. The local network LAN is realized by a local area network for ACD servers ACD-S that are spatially nearby, and is realized by a wide area network for ACD servers ACD-S that are spatially further away. In principle, all types of networks are suitable, such as bus networks, ring and star networks. Preferably, local networks LAN are provided, which are already available at the operators of private or public communication networks. The transmission of the resource request ar, the response aw and the reservation release rfi ensues in a manner corresponding to the transmission method or, respectively, transmission protocol used in the respective local network LAN.

Figure 2:
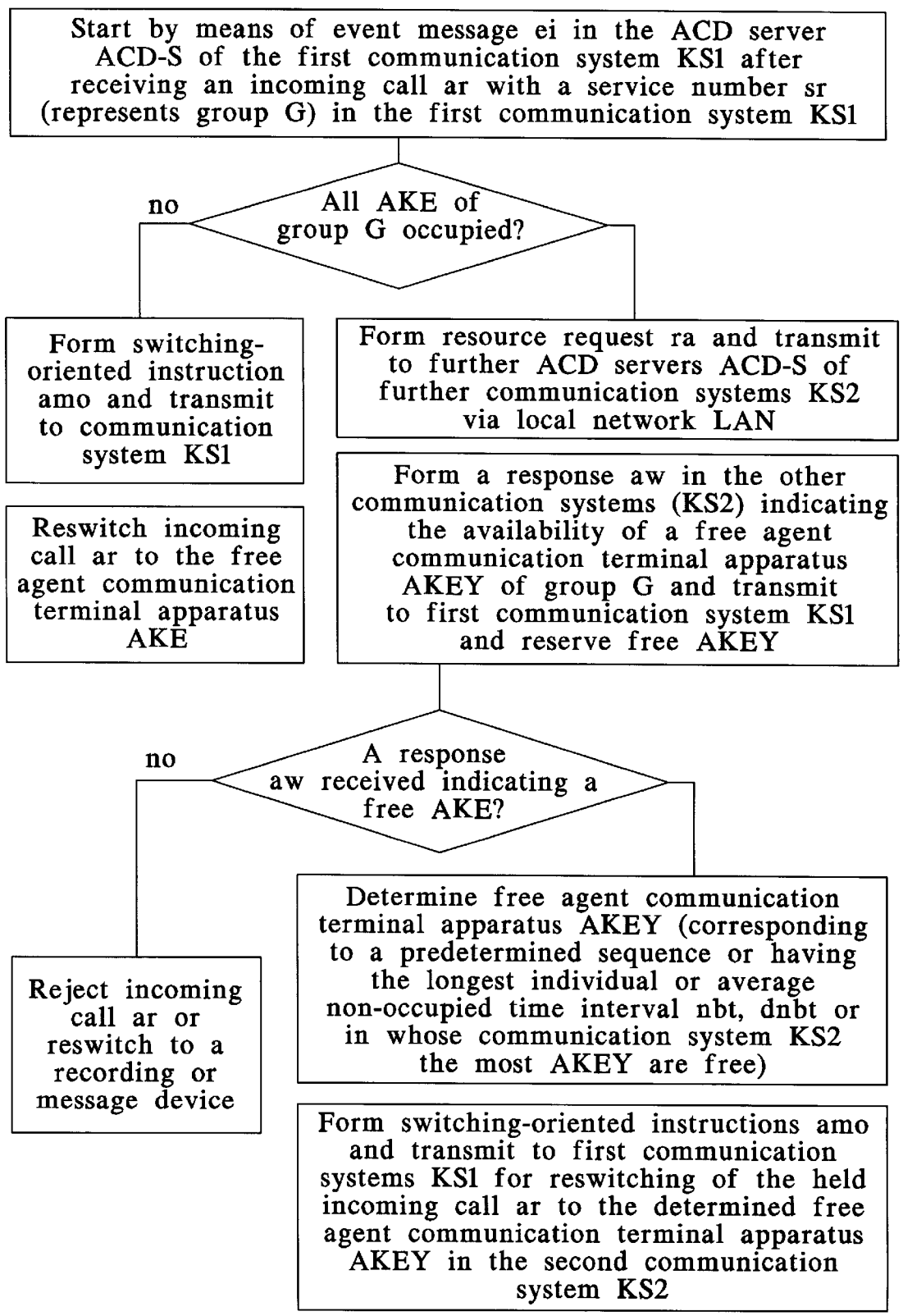
FIG. 2 is a flow chart depicting the inventive method.

If in the respective communication system KS a free agent communication terminal apparatus AKE can no longer be found for an incoming call, and if the group G is distributed over several (two, in the exemplary embodiment) communication systems KS1, 2, the inventive method is used. The individual steps of the method are shown in the self-explanatory flow chart in FIG. 2.

Figure 3:
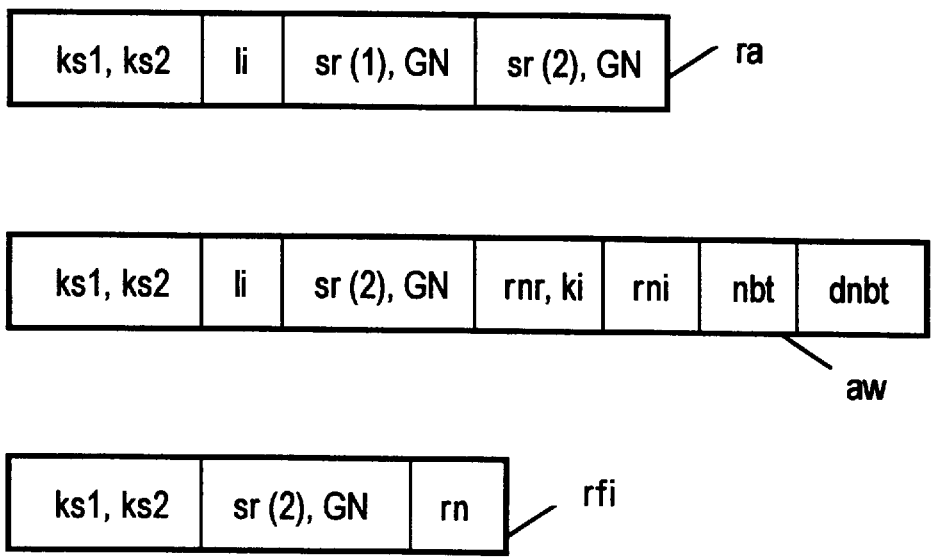
FIG. 3 is resource request, a reservation release and a response.

FIG. 3 shows the structure of a resource request ra, a reservation release rfi and a response aw, which all comprise a communication system information ks1, 2 that represents the origin and target communication system KS1, 2. Subsequently, a line information li, which represents the physical communication connection KA that transmits the call ar respectively coming in the first, i.e. originating, communication system KS1, is inserted into the resource request ar and the response aw. The resource request ra additionally comprises a service number sr(1) that represents the allocated group G of agent communication terminal apparatus AKE in the first, i.e. originating, communication system KS1, and a service number sr(2) that represents the allocated group G of agent communication terminal apparatus (AKE) in the second, i.e. target, communication system KS2. A group of agent communication terminal apparatus AKE is unambiguously defined by a service number sr and can be addressed through this number. As already explained, the service numbers sr(1), (2) belonging to the respective group G in the first and second communication system KS1, 2 may be the same, but may also be different. In addition, group names GN (indicated by the designation GN in FIG. 3) can be indicated.

In addition, a call number rnr is indicated in the response aw, indicating the free agent communication terminal apparatus AKEY, or an identification information ki indicating that no agent communication terminal apparatus AKE is free. By means of the call number rnr indicating the free agent communication terminal apparatus AKEY, an incoming call ar reswitched to another communication system KS2 can be switched immediately to the free agent communication terminal apparatus AKEY. Optionally, the response aw contains a set information mi indicating the number of agent communication terminal apparatus AKE of the respective group G that are still free, a non-occupied time interval nbt of the indicated free agent communication terminal apparatus AKEY and/or a [ . . . ] the average non-occupied time interval dnbt of all agent communication terminals apparatus AKE configured in the respective group G. By means of the optional information mi, nbt, dnbt, an advantageous evaluation is possible, given several responses aw received in a requesting communication system KS1, 2, and a more uniform and more efficient utilization of the resources of the agent communication terminal apparatus AKE allocated to a group G is possible. If the set information mi is indicated with each response aw, the communication system KS1, 2 having the most agent communication terminal apparatus AKE still free can be selected. If the non-occupied time intervals nbt are inserted into the responses aw, the free agent communication terminal apparatus AKE to which no incoming call ar has been switched for the longest time interval can be selected in the requesting communication system KS1.

The selection of an agent communication terminal apparatus AKE that is still free, given several free agent communication terminal apparatus AKE, can alternatively also be carried out in the addressed communication system KS2. The selection is made in particular with regard to the non-occupied or, respectively, occupied times, and the number of agent communication terminal apparatus still free in the respective communication system KS1, 2.

The inventive method is also to be used for several groups of agent communication terminal apparatus AKE (not shown), whereby the communication systems are to be correspondingly constructed with regard to the service communication connections SKA, the line groups SA including the call folder AO, and the program structures DGV.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for determining free agent communication terminal apparatus in communication networks with automatic call distribution, comprising the steps of:

respectively switching incoming calls addressed to a service number to a free agent communication terminal apparatus of a communication system, the free agent communication terminal apparatus being selected through the automatic call distribution from a respective group of agent communication terminal apparatus allocated to the service number, the agent communication terminal apparatus allocated to the respective group being distributed via several communication systems of the communication network;

forming resource requests, given a call with a service number coming in to a respective communication system, for which call there is no longer a free agent communication terminal apparatus in the respective group of the respective communication system, and transmitting the resource requests to those communication systems to which agent communication terminal apparatus of the respective group are distributed;

determining, in each communication system that receives a resource request, availability of an agent communication terminal apparatus allocated to the respective group and forming and transmitting a response to the requesting communication system;

identifying a communication system with a free agent communication terminal apparatus of the respective group in the requesting communication system from the transmitted response, and switching the incoming call to the identified communication system using the automatic call distribution in the sense of a switching to the free agent communication terminal apparatus.

2. The method according to claim 1, wherein the resource request and the response are transmitted via the communication network.

3. The method according to claim 1, wherein the resource request and the response are transmitted via an additional local network.

4. The method according to claim 1, wherein given an availability of a respective agent communication terminal apparatus allocated to the respective group, the respective agent communication terminal apparatus is reserved.

5. The method according to claim 4, after identification of a communication system signaling a free agent terminal communication apparatus, a reservation release is formed by the automatic call distribution for other communication systems that likewise signal a free agent communication terminal apparatus of the respective group, and wherein this release is transmitted to the other communication systems, whereupon reservation of the agent communication terminal apparatus is removed in the other communication systems.

6. The method according to claim 5, wherein the reservation of the respective agent communication terminal apparatus of the respective group is removed after a predetermined time interval in the communication systems that transmit a response to the requesting communication system, provided that no reservation release for the respective agent communication terminal apparatus is received thereat.

7. The method according to claim 1, wherein in the requesting communication system after a reception of responses that signal no free agent communication terminal apparatus of the respective group, the incoming call is switched to an installation for further call handling by the automatic call distribution, or is rejected.

8. The method according to claim 1, wherein the resource request has communication system information that represents originating and target communication systems, line information that represents a physical communication connection that transmits the call respectively being received in the originating communication system, a service number that represents an allocated group of agent communication terminal apparatus in the originating communication system, and a service number that represents an allocated group of agent communication terminal apparatus in the target communication system.

9. The method according to claim 1, wherein the response has communication system information representing originating and target communication systems, a line information that represents a physical communication connection that transmits the call respectively being received in the originating communication system, a call number indicating free agent communication terminal apparatus, or identification information indicating that no agent communication terminal apparatus is free, and a service number representing an allocated group of free or non-free agent communication terminal apparatus in the target communication system.

10. The method according to claim 9, the response further has at least one of:

set information indicating the number of agent communication terminal apparatus of the respective group that are still free;

a non-occupied time interval of indicated free agent communication terminal apparatus;

the average non-occupied time interval of all agent communication terminal apparatus configured in the respective group.

11. The method according to claim 5, wherein the reservation release has communication system information that represents originating and target communication systems, a call number that indicates the reserved agent communication terminal apparatus, and a service number that represents an allocated group of reserved agent communication terminal apparatus in the target communication system.

12. The method according to claim 1, wherein in the communication systems receiving a resource request, after a determination of several free agent communication terminal apparatus of the respective group, a free agent communication terminal apparatus to which no incoming call has been switched for the longest time interval is selected.

13. The method according to claim 1, wherein in the requesting communication system, after reception of several responses respectively indicating a free agent communication terminal apparatus of the respective group, the free agent communication terminal apparatus of that response is selected according to at least one of the following criteria:

one of the communication systems of the free agent communication terminals in the respective group is preferred according to a predetermined sequence;

no incoming call has been switched to the indicated free agent communication terminal apparatus for a longest time interval;

a communication system having the greatest number of free agent communication terminal apparatus in the respective group;

an average non-occupied time interval of all agent communication terminal apparatus configured in the respective group is the longest.

14. A method for determining free agent communication terminal apparatus in communication networks with automatic call distribution, comprising the steps of:

respectively switching incoming calls addressed to a service number to a free agent communication terminal apparatus of a communication system, the free agent communication terminal apparatus being selected through the automatic call distribution from a respective group of agent communication terminal apparatus allocated to the service number, the agent communication terminal apparatus allocated to the respective group being distributed via several communication systems of the communication network;

forming resource requests, given a call with a service number coming in to a respective communication system, for which call there is no longer a free agent communication terminal apparatus in the respective group of the respective communication system, and transmitting the resource requests to those communication systems to which agent communication terminal apparatus of the respective group are distributed;

determining, in each communication system that receives a resource request, availability of an agent communication terminal apparatus allocated to the respective group and forming and transmitting a response to the requesting communication system;

identifying a communication system with a free agent communication terminal apparatus of the respective group in the requesting communication system from the transmitted response, and switching the incoming call to the identified communication system using the automatic call distribution in the sense of a switching to the free agent communication terminal apparatus;

receiving, given an availability of a respective agent communication terminal apparatus allocated to the respective group, the respective agent communication terminal apparatus;

forming, after identification of a communication system signaling a free agent terminal communication apparatus, a reservation release by the automatic call distribution for other communication systems that likewise signal a free agent communication terminal apparatus of the respective group, and transmitting this release to the other communication systems, whereupon reservation of the agent communication terminal apparatus is removed in the other communication systems.

15. The method according to claim 14, wherein the reservation of the respective agent communication terminal apparatus of the respective group is removed after a predetermined time interval in the communication systems that transmit a response to the requesting communication system, provided that no reservation release for the respective agent communication terminal apparatus is received thereat.

16. The method according to claim 14, wherein in the requesting communication system after a reception of responses that signal no free agent communication terminal apparatus of the respective group, the incoming call is switched to an installation for further call handling by the automatic call distribution, or is rejected.

17. The method according to claim 14, wherein in the communication systems receiving a resource request, after a determination of several free agent communication terminal apparatus of the respective group, a free agent communication terminal apparatus to which no incoming call has been switched for the longest time interval is selected.

18. The method according to claim 14, wherein in the requesting communication system, after reception of several responses respectively indicating a free agent communication terminal apparatus of the respective group, the free agent communication terminal apparatus of that response is selected according to at least one of the following criteria:

one of the communication systems of the free agent communication terminals in the respective group is preferred according to a predetermined sequence;

no incoming call has been switched to the indicated free agent communication terminal apparatus for a longest time interval;

a communication system having the greatest number of free agent communication terminal apparatus in the respective group;

an average non-occupied time interval of all agent communication terminal apparatus configured in the respective group is the longest.

19. A method for determining free agent communication terminal apparatus in communication networks with automatic call distribution, comprising the steps of:

respectively switching incoming calls addressed to a service number to a free agent communication terminal apparatus of a communication system, the free agent communication terminal apparatus being selected through the automatic call distribution from a respective group of agent communication terminal apparatus allocated to the service number, the agent communication terminal apparatus allocated to the respective group being distributed via several communication systems of the communication network;

forming resource requests, given a call with a service number coming in to a respective communication system, for which call there is no longer a free agent communication terminal apparatus in the respective group of the respective communication system, and transmitting the resource requests to those communication systems to which agent communication terminal apparatus of the respective group are distributed;

determining, in each communication system that receives a resource request, availability of an agent communication terminal apparatus allocated to the respective group and forming and transmitting a response to the requesting communication system;

identifying a communication system with a free agent communication terminal apparatus of the respective group in the requesting communication system from the transmitted response, and switching the incoming call to the identified communication system using the automatic call distribution in the sense of a switching to the free agent communication terminal apparatus;

reserving, given an availability of a respective agent communication terminal apparatus allocated to the respective group, the respective agent communication terminal apparatus;

forming, after identification of a communication system signaling a free agent terminal communication apparatus, a reservation release by the automatic call distribution for other communication systems that likewise signal a free agent communication terminal apparatus of the respective group, and wherein this release is transmitted to the other communication systems, whereupon reservation of the agent communication terminal apparatus is removed in the other communication systems;

the resource request having communication system information that represents originating and target communication systems, line information that represents a physical communication connection that transmits the call respectively being received in the originating communication system, a service number that represents an allocated group of agent communication terminal apparatus in the originating communication system, and a service number that represents an allocated group of agent communication terminal apparatus in the target communication system;

the response having communication system information representing originating and target communication systems, a line information that represents a physical communication connection that transmits the call respectively being received in the originating communication system, a call number indicating free agent communication terminal apparatus, or identification information indicating that no agent communication terminal apparatus is free, and a service number representing an allocated group of free or non-free agent communication terminal apparatus in the target communication system;

the response request further having at least one of set information indicating the number of agent communication terminal apparatus of the respective group that are still free, a non-occupied time interval of indicated free agent communication terminal apparatus, and average non-occupied time interval of all agent communication terminal apparatus configured in the respective group;

the reservation release having communication system information that represents originating and target communication systems, a call number that indicates the reserved agent communication terminal apparatus, and a service number that represents an allocated group of reserved agent communication terminal apparatus in the target communication system.

20. The method according to claim 19, wherein the reservation of the respective agent communication terminal apparatus of the respective group is removed after a predetermined time interval in the communication systems that transmit a response to the requesting communication system, provided that no reservation release for the respective agent communication terminal apparatus is received thereat.

* * * * *